Jan. 17, 1967   J. S. PERRYMAN   3,298,486
SPRING CLUTCH MECHANISM
Filed Jan. 28, 1965   2 Sheets-Sheet 1
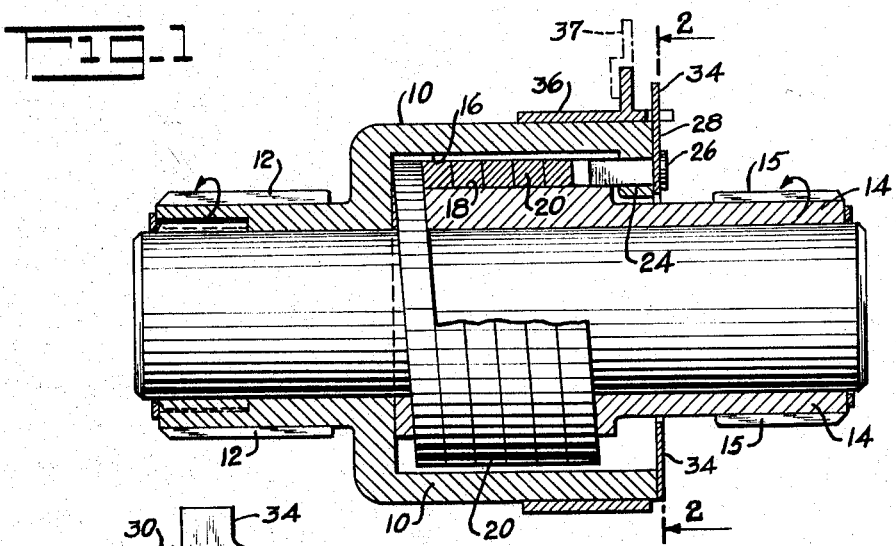
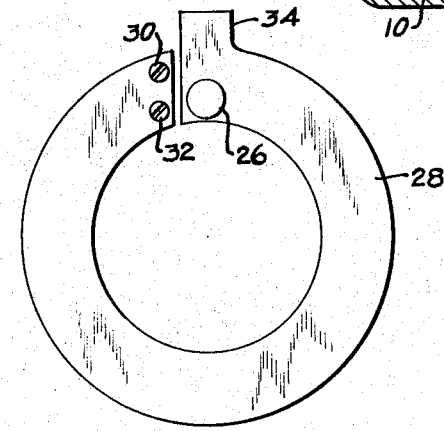
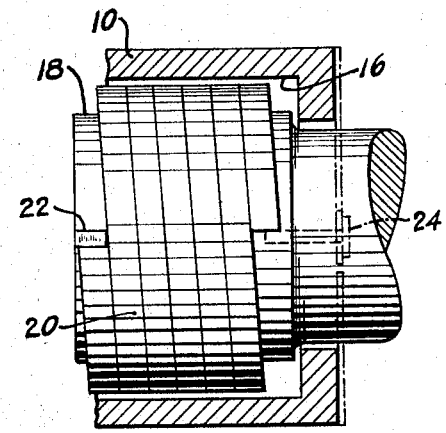
INVENTOR.
JOHN S. PERRYMAN
BY
William V. Ebs
HIS ATTORNEY Jan. 17, 1967 J. S. PERRYMAN 3,298,486
SPRING CLUTCH MECHANISM Filed Jan. 28, 1965 2 Sheets-Sheet 2

INVENTOR.
JOHN S. PERRYMAN
BY
William V. Ebs
HIS ATTORNEY

United States Patent Office 3,298,486
Patented Jan. 17, 1967

3,298,486
SPRING CLUTCH MECHANISM
John S. Perryman, Kinnelon, N.J., assignor to Curtiss-Wright Corporation, a corporation of Delaware
Filed Jan. 28, 1965, Ser. No. 428,816
9 Claims. (Cl. 192—47)

My invention relates to spring clutches, that is, clutches of the type employing a helical band in the form of a coil spring as a friction element, and has as a prime object the provision of an improved spring clutch readily disengageable while running and transmitting substantial torque, and/or in which overrunning drag is reduced to a minimum.

Another object of the invention is to provide improved means, both structurally reliable and efficient in a spring clutch for accomplishing clutch engagement and disengagement.

It is also an object of the invention to provide a spring clutch in which overrunning drag due to rubbing friction between a relatively rotating clutch spring and clutch member is encountered on only a very limited area of the clutch spring.

Other objects and advantages of the invention will become apparent hereinafter.

In the spring clutch of the invention, a slight actuating torque applied to the spring element of the clutch by an actuating element rotatable with an input shaft is supplemented by frictional engagement of the spring element with a cylindrical surface of an input member of the clutch and imparted to an output member during periods of clutch engagement. One of the said elements is deflectable from one position, wherein the extreme end of the spring element is engaged by the actuating element to initiate and maintain clutch engagement upon rotation of the input shaft in at least one direction, to another position permitting the input and output member to rotate independently of each other. In one form of the invention a finger slidably mounted in structure rotatable with the input shaft is the actuating element. A resilient member secured to the clutch input member tends to maintain the finger in a position to act upon the low torque end of the clutch spring, but the finger can be manually withdrawn from such position to disengage the clutch. In another form of the invention an axially deflectable resilient key which is anchored to the clutch input member, is provided to actuate the clutch spring. In still another form of the invention the actuating element is a tab on the input member engageable with an axially deflectable end of the spring. Overrunning drag in a unidirectional clutch designed in accordance with the invention is limited since there is no rubbing during overrunning between a relatively rotating spring and clutch member at the inside or outside diameter of the spring. Rubbing occurs only between the end of the clutch spring and the actuating element as the spring end rides over the actuation element.

Referring to the drawings:

FIG. 1 is a vertical longitudinal sectional view showing a disconnectible and overrunning clutch constructed in accordance with the invention;

FIG. 2 is an end view showing an element of the clutch of FIG. 1;

FIG. 3 is a fragmentary top plan view of the clutch of FIG. 1;

Figure 4:
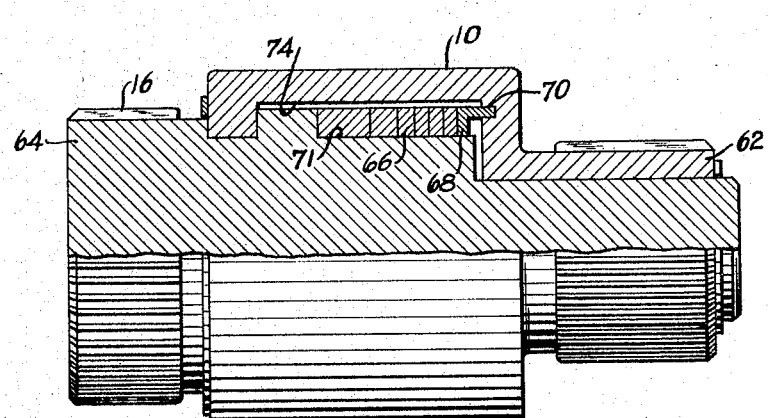
FIG. 4 is a vertical longitudinal sectional view showing an overrunning clutch constructed according to the invention.

The disconnectible and overrunning clutch of FIGS. 1, 2 and 3 includes input member 10 having splines at 12 to facilitate connecting the member to a drive shaft, and output member 14 having splines at 15 for connecting the member 14 to an output shaft. The members 10 and 14 have a common axis of rotation and include radially spaced concentric cylindrical surfaces 16 and 18 respectively. A right-hand helical spring 20 located between cylindrical surfaces 16 and 18 has an interference fit with cylindrical surface 18 on output member 14 when the clutch is disengaged. One end of the spring 20 engages an abutment 22 on the output member 14 and the other end is subject to actuation by a finger 24 rotatable with the input member.

The finger 24 is slidably mounted in the input member and is attached at one end 26 to a resilient split washer-like member 28. As shown, the finger 24 attaches to a free end of member 28. The other end of the member is secured as by the screws 30 and 32 to the input member 10. Washer-like member 28 tends to maintain finger 24 in an extreme leftward position as viewed in FIG. 1, that is, in a position to contact the extreme end of spring 20 upon rotation of input member 10 in a counterclockwise direction as viewed from the input end of the clutch, although the finger is movable from this position. The member 28 includes a radially projecting tab 34 on the free end which tab is subject to engagement by a sleeve 36 slidably mounted on input member 10 and actuable as by a manually controllable member 37.

Assuming the output member 14 is connected to a loaded output shaft and input member 10 is driven in the direction indicated in FIG. 1, that is, counterclockwise as viewed from the input end of the clutch, the finger 24 is caused to act against the end of the spring, and the spring is caused to expand away from the cylindrical surface 18 on output member 14 and into contact with cylindrical surface 16 on input member 10 to establish a driving connection between the input and output members through the spring. The torque applied to the spring 20 by the finger 24 is supplemented by the friction force between the spring and surface 16 and applied to abutment 22 to rotate the output member. The torque which is required at the finger 24 to provide a particular output torque is dependent upon the number of turns of the spring and the coefficient of friction between the spring and cylindrical surface 16 according to the following relationship:

$$Q_e = Q_o / e^{2\pi \mu N}$$

where
$Q_e$=Torque on finger
$Q_o$=Output torque
$e$=2.178
$\pi$=3.1416
$\mu$=Coefficient of friction
$N$=Number of turns of the spring As will be apparent from the stated formula, in a clutch according to the invention, a large output torque may be realized with only a small torque applied to the spring by finger 24. For example, in a clutch wherein the spring has eight turns and the coefficient of friction is 0.1, the torque at the finger is only about $\frac{1}{150}$ of the output torque.

Since the finger 24 is subjected only to a low level of stress, its structural integrity is not readily impaired. Also, because of the small force at the finger even while the clutch is transmitting substantial torque, the finger can be easily withdrawn from its position of engagement with the end of the spring 20 by moving sleeve 36 to the right as viewed in FIG. 1 to thereby cause the sleeve to act upon the free end of member 28 and so move finger 24 out of its spring engaging position.

Withdrawal of the finger 24 from its position of engagement with the end of spring 20 causes the spring 20 to contract. The coils separate from cylindrical surface 16 on input member 10 and resume their interference fit with cylindrical surface 18 on output member 14. The drive connection between the input and output members is eliminated when the spring separates from surface 16 on the input member, and thereafter the input and output members can rotate independently of each other. The drive connection between the input and output members is eliminated automatically and without withdrawal of finger 24 if the output member 14 overruns the input member, that is, if the output member at any time rotates faster than the input member. The drive connection is eliminated because the extreme end of the spring 20 separates from the finger 24 and the spring contracts away from cylindrical surface 16. The spring resumes contact with output member 14 and rotates with the output member. The end coil of the spring 20 adjacent the finger 24 rides on the finger as input member 10 rotates relative to output member 14 and moves the finger out of the path of the coil against the spring action of the member 28. Since frictional drag due to rotation of the spring is encountered only at the end of the spring where it contacts the finger 24, resistance to rotation of the output member during overrunning is slight and very little heat is generated.

The clutch of FIGS. 1, 2 and 3 is unidirectional, that is, there is only one direction in which the input member 10 may be rotated to drive the output member 14, and this is counterclockwise as viewed from the input end of the clutch in the arrangement shown, although the drive connection might be made clockwise instead by using a left-hand helical spring in place of the right-handed spring 20. If the input member is rotated in a direction opposite to the drive direction, the finger 24 merely rides over the end coil of the spring and is cammed axially in the process.

Figure 5:
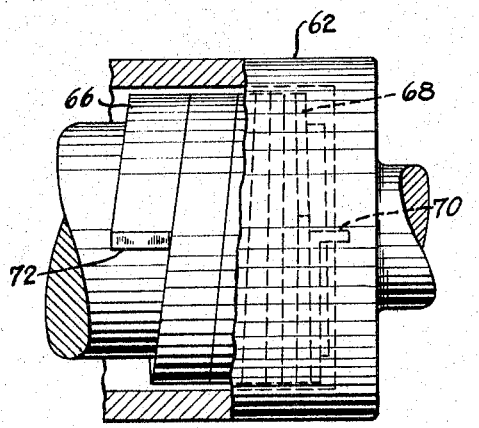
FIG. 5 is a fragmentary top plan view of the clutch of FIG. 4.
Figure 6:
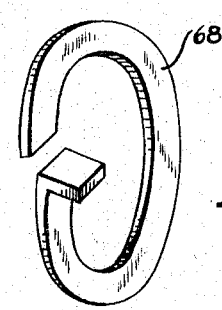
FIG. 6 is a perspective view showing an element of the clutch of FIG. 5.

In the clutch of FIGS. 4, 5 and 6 wherein reference character 62 designates the clutch input member and reference character 64 the output member, the clutch spring 66 is subject to actuation by an axially compressible resilient key 68 which is affixed at one end as at 70 in the input member. The spring, which has an interference fit with cylindrical surface 71 on the output member 64 when the clutch is disengaged, has one end in engagement with abutment 72 on the output member. The other end of the spring is engageable by the free end of key 68.

The clutch transmits power in one direction of rotation which is the direction in which the free end of the key 68 is caused to act against the end of the spring and cause the spring to be expanded into contact with cylindrical surface 74 on the input member. Assuming rotation in the driving direction, the torque applied by the key 68 to the spring 66 is amplified by frictional engagement of the spring with the cylindrical surface 74 on the input member and applied to the output member 64 by way of the abutment 72 as in the clutches described hereinbefore. The clutch, although not disconnectible by an operator can automatically disconnect to permit the output member to overrun the input member. If the output member, at any time, rotates faster than the input member the spring 66 contracts, disconnecting the input and output members. The spring re-engages cylindrical surface 71 and rotates with the output member. The end coil of the spring 66 rides on the key and the key is axially compressed to accommodate the coil. Drag associated with such overrunning operation of the clutch is very slight, since the spring remains out of contact with the input member during overrunning and the only friction generated by rotation of the spring is at the end coil where said end coil and key are in contact.

Figure 7:
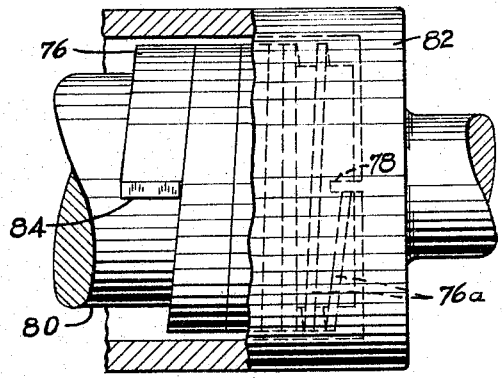
FIG. 7 is a view similar to FIG. 5 for another overrunning clutch constructed according to the invention.

FIG. 7 indicates a clutch functioning in the manner of the clutch of FIGS. 4, 5 and 6, but differing therefrom in construction. There is no axially compressible key rotatable with an input member in the clutch of FIG. 9. The clutch spring 76 however, includes spaced coils 76a which render the spring axially compressible, and the input member is provided with a tab 78 which engages the extreme end of the spring upon rotation of the input member in the drive direction to bring about expansion of the spring away from output member 80 with which it has an interference fit and enforced engagement with the input member 82 to thereby establish a driving connection between the members through the spring to abutment 84 on the output member. During overrunning the end coil of the spring rides over the tab 78 and the spring is contracted in the process. Overrunning drag is slight as in the clutches already described.

The clutches of the invention may be provided with a clutch spring in which the coils are of uniform width as in the clutch of FIGS. 1, 2 and 3 or with a spring in which the coils taper in the manner of the other clutches shown in the drawings. The use of a tapered spring is however, preferable in the interest of conserving space and providing a compact unit. The spring can be tapered from a maximum width at the output end to a lesser width at the other end in the clutch of the invention without decreasing the load carrying capability of the device because the load carried by the various coils of the spring varies from a maximum at the output end of the spring to a minimum at the input end.

While several modifications of the invention have been shown and described it will be apparent to those skilled in the art that still other modifications and variations may be made without departing from the spirit and scope of the invention, and it is to be understood that the invention is not limited to the specific description herein or to the particular figures of the drawing.

What is claimed is:

1. A spring clutch comprising an input member having a cylindrical surface thereon, an output member; helical spring means concentric with the cylindrical surface on the input member and out of contact with the said cylindrical surface; structure on the output member at one end of the spring means to prevent rotational movement of the said one end of the spring means in at least one direction relative to the output member; means for controlling operation of the clutch, rotatable with the input member and engageable with the other end of the spring means to cause the spring means to wind against the cylindrical surface on the input member upon rotation of the input member in said one direction and thereby drivably connect the input and output members through the spring means, one of the said means including a resilient portion effective for biasing a part of the said one means to a position wherein the clutch controlling means and spring means engage to drivably connect the input and output members, and effective to render the said part deflectable by camming action of the spring means and the control means to a position permitting the output member to rotate at a greater speed than the input member.

2. A spring clutch as defined in claim 1 wherein the helical spring means tightly engages the cylindrical surface of the output member when the control means is out of engagement with the said other end of the spring means.

3. A spring clutch as defined in claim 1 wherein the control means includes the said resilient portion.

4. A spring clutch as defined in claim 3 including manually operable means for moving the control means to disconnect the input and output members.

5. A spring clutch as defined in claim 1 wherein the control means includes an actuating element slidable in the input member, the control means includes the said resilient portion and such resilient portion is a split washer-like member having the actuating element secured thereto.

6. A spring clutch as defined in claim 5 including means engageable with said washer-like member for moving the actuating element to disconnect the input and output members.

7. A spring clutch as defined in claim 1 wherein the spring means includes the said resilient portion.

8. A spring clutch as defined in claim 1 wherein the control means is an axially compressible key which is secured to the input member.

9. A spring clutch as defined in claim 1 wherein the control means is an actuating element affixed to the input member, the spring means includes the said resilient portion and such resilient portion comprises axially compressible spring coils.

References Cited by the Examiner
UNITED STATES PATENTS

| | | | |
|---|---|---|---|
| 1,909,420 | 5/1933 | Palmgren | 192—81 X |
| 2,541,947 | 2/1951 | Starkey | 192—56 |
| 2,574,714 | 11/1951 | Smith | 192—41 X |
| 3,019,871 | 2/1962 | Sauzzedde | 192—41 |

DAVID J. WILLIAMOWSKY, *Primary Examiner.*

A. T. McKEON, *Assistant Examiner.*